(12) United States Patent
Moriguchi et al.

(10) Patent No.: US 11,803,165 B2
(45) Date of Patent: Oct. 31, 2023

(54) MANUFACTURING SUPPORT SYSTEM FOR PREDICTING PROPERTY OF ALLOY MATERIAL, METHOD FOR GENERATING PREDICTION MODEL, AND COMPUTER PROGRAM

(71) Applicant: UACJ CORPORATION, Tokyo (JP)

(72) Inventors: Takahiro Moriguchi, Tokyo (JP); Yusuke Yamamoto, Tokyo (JP)

(73) Assignee: UACJ Corporation, Tokyo (JP)

( * ) Notice: Subject to any disclaimer, the term of this patent is extended or adjusted under 35 U.S.C. 154(b) by 77 days.

(21) Appl. No.: 17/680,747

(22) Filed: Feb. 25, 2022

(65) Prior Publication Data

US 2022/0276619 A1  Sep. 1, 2022

(30) Foreign Application Priority Data

Mar. 1, 2021  (JP) ................... 2021-031615

(51) Int. Cl.
*G05B 13/02* (2006.01)
*G05B 13/04* (2006.01)

(52) U.S. Cl.
CPC ....... *G05B 13/0265* (2013.01); *G05B 13/048* (2013.01)

(58) Field of Classification Search
CPC .......................... G05B 13/0265; G05B 13/048
USPC ......................................................... 700/47
See application file for complete search history.

(56) References Cited

U.S. PATENT DOCUMENTS

| | | | | |
|---|---|---|---|---|
| 11,347,910 | B1* | 5/2022 | Martiny | G06F 30/27 |
| 2009/0216347 | A1* | 8/2009 | Mahfouf | G06N 5/048 |
| | | | | 700/145 |
| 2016/0034614 | A1* | 2/2016 | Wang | B22D 21/007 |
| | | | | 703/2 |
| 2018/0113967 | A1* | 4/2018 | Agrawal | G01N 33/2022 |
| 2020/0257933 | A1* | 8/2020 | Steingrimsson | B22F 12/45 |
| 2021/0406433 | A1* | 12/2021 | Okuno | G16C 60/00 |
| 2022/0100932 | A1* | 3/2022 | Nakatsuji | C21D 8/0263 |
| 2022/0207218 | A1* | 6/2022 | Lu | G06N 3/08 |
| 2022/0276619 | A1* | 9/2022 | Moriguchi | G05B 13/0265 |

FOREIGN PATENT DOCUMENTS

| | | | |
|---|---|---|---|
| CN | 107609647 A | * | 1/2018 |
| CN | 110674568 A | * | 1/2020 |
| CN | 111063401 A | * | 4/2020 |

(Continued)

*Primary Examiner* — Ronald D Hartman, Jr.
(74) *Attorney, Agent, or Firm* — Renner, Otto, Boisselle & Sklar, LLP

(57) ABSTRACT

In accordance with a program, a processor obtains a plurality of manufacturing parameters and a measured value of an at least one property of an alloy material, calculates a pre-predicted value based on a first manufacturing parameter included in the plurality of manufacturing parameters using a prediction expression describing a relationship between the first manufacturing parameter, and a pre-predicted value of the property representing a roughly calculated value of a target predicted value that is a target value of the property, calculates a difference between the pre-predicted value and a measured value of the property, and trains a model using a training data set including a second manufacturing parameter and the difference, to generate a trained model that is used to predict the at least one property.

19 Claims, 10 Drawing Sheets

(56) References Cited

FOREIGN PATENT DOCUMENTS

| CN | 111241750 | A | * | 6/2020 | |
|---|---|---|---|---|---|
| CN | 111369039 | A | * | 7/2020 | ............. G06N 20/10 |
| JP | 4623020 | B2 | | 2/2011 | |
| JP | 2014-038595 | A | | 2/2014 | |

* cited by examiner

MANUFACTURING SUPPORT SYSTEM FOR PREDICTING PROPERTY OF ALLOY MATERIAL, METHOD FOR GENERATING PREDICTION MODEL, AND COMPUTER PROGRAM

CROSS-REFERENCE TO RELATED APPLICATION

This application claims priority to Japanese Patent Application No. 2021-031615, filed on Mar. 1, 2021, the entire contents of which are hereby incorporated by reference.

BACKGROUND

The present disclosure relates to manufacturing support systems for predicting a property of an alloy material, methods for generating a prediction model, and computer programs.

A wide variety of industrial materials are used in various technical fields. Industrial materials are classified and tested according to various standards (e.g., JIS and ASTM). The properties of each individual product vary depending on various factors (composition, manufacturing process, manufacturing condition (e.g., the temperature, rate, or time of heat treatment), etc.). Therefore, it is not easy to select or develop a material that is most suitable for required properties. In addition, in industrial terms, not only properties but also cost, supply stability, product life, etc., may be taken into account in selecting materials.

Selection, adjustment, or modification of manufacturing conditions has been so far conducted mainly based on human experience. That is, these have been a human task. However, due to recent advances in ICT technologies, techniques of supporting selection, adjustment, or modification of manufacturing conditions using a computer have been much developed, and are taking the place of humans in a portion of such tasks.

Japanese Laid-Open Patent Publication No. 2014-38595 discloses a material property prediction device that calculates a similarity between past manufacturing conditions stored in a track record database and manufacturing conditions for an object to be predicted, generates a prediction model using the similarity, and predicts a material property of a steel material using the prediction model. In that material property prediction device, an assessment function weighted by the similarity is used to assess a prediction error of the prediction model. The manufacturing conditions for a steel material are controlled based on the predicted material property of the steel material.

Japanese Patent No. 4623020 discloses a designing support device that calculates manufacturing conditions that are other than those selected by a designer and that meet a required quality/property value, based on data stored in a quality database that stores past manufacturing conditions and quality/property values obtained under the past manufacturing conditions. That designing support device calculates an influence coefficient that indicates the degree of an influence of manufacturing conditions selected by a designer and other conditions on the required quality/property value, from neighboring data of the manufacturing conditions that is stored in the quality database.

SUMMARY

In the method for predicting a material property of a steel material which is disclosed in Japanese Laid-Open Patent Publication No. 2014-38595 and the method for calculating an influence coefficient which is disclosed in Japanese Patent No. 4623020, the predicted values obtained and the results of calculation of the influence coefficient are all within the ranges of past manufacturing track records. Therefore, there are difficulties in obtaining solutions that do not fall within the ranges.

The prior art technique needs further improvement in view of the above problems. One non-limiting, and exemplary embodiment provides: a manufacturing support system capable of improving the accuracy of a prediction model for predicting a property of an alloy material not only within the ranges of manufacturing conditions in a past manufacturing track record but also out of these ranges, and of selecting manufacturing conditions meeting a target design range (or a standard range) of the property, using the prediction model; and a method and computer program for generating a prediction model.

In one non-limiting, and exemplary embodiment, a manufacturing support system according to the present disclosure is for predicting at least one property of an alloy material that is manufactured through a plurality of manufacturing processes, including: a processor; a memory to store a program for controlling an operation of the processor; and a storage device to store data including a plurality of manufacturing parameters each representing a corresponding one of manufacturing conditions for the manufacturing processes, and a measured value of the at least one property of the alloy material that has been manufactured under the manufacturing conditions for the manufacturing processes. In accordance with the program, the processor performs operations including: accessing the storage device to obtain the plurality of manufacturing parameters and the measured value of the at least one property; obtaining a pre-predicted value calculation expression describing a relationship between a first manufacturing parameter included in the plurality of manufacturing parameters, and a pre-predicted value of the at least one property representing a roughly calculated value of a target predicted value that is a target value of the at least one property; calculating the pre-predicted value based on the first manufacturing parameter using the pre-predicted value calculation expression; calculating a difference between the calculated pre-predicted value, and the measured value of the at least one property corresponding to the pre-predicted value; and training a model using a training data set including a second manufacturing parameter that is included in the plurality of manufacturing parameters and is different from the first manufacturing parameter, and the calculated difference, to generate a trained model that is used to predict the at least one property.

In one non-limiting, and exemplary embodiment, a method according to the present disclosure is for generating a prediction model used for predicting at least one property of an alloy material that is manufactured through a plurality of manufacturing processes, and includes: accessing data including a plurality of manufacturing parameters each representing a corresponding one of manufacturing conditions for the manufacturing processes, and a measured value of the at least one property of the alloy material that has been manufactured under the manufacturing conditions for the manufacturing processes, to obtain the plurality of manufacturing parameters and the measured value of the at least one property; obtaining a pre-predicted value calculation expression describing a relationship between a first manufacturing parameter included in the plurality of manufacturing parameters, and a pre-predicted value of the at least one property representing a roughly calculated value of a target predicted value that is a target value of the at least one property; calculating the pre-predicted value based on the first manufacturing parameter using the pre-predicted value calculation expression; calculating a difference between the calculated pre-predicted value, and the measured value of the at least one property corresponding to the pre-predicted value; and training a model using a training data set including a second manufacturing parameter that is included in the plurality of manufacturing parameters and is different from the first manufacturing parameter, and the difference, to generate the prediction model.

In one non-limiting, and exemplary embodiment, a computer program according to the present disclosure is for causing a computer to generate a prediction model used for predicting at least one property of an alloy material that is manufactured through a plurality of manufacturing processes. The computer program causes the computer to perform operations including: accessing data including a plurality of manufacturing parameters each representing a corresponding one of manufacturing conditions for the manufacturing processes, and a measured value of the at least one property of the alloy material that has been manufactured under the manufacturing conditions for the manufacturing processes, to obtain the plurality of manufacturing parameters and the measured value of the at least one property; obtaining a pre-predicted value calculation expression describing a relationship between a first manufacturing parameter included in the plurality of manufacturing parameters, and a pre-predicted value of the at least one property representing a roughly calculated value of a target predicted value that is a target value of the at least one property; calculating the pre-predicted value based on the first manufacturing parameter using the pre-predicted value calculation expression; calculating a difference between the calculated pre-predicted value, and the measured value of the at least one property corresponding to the pre-predicted value; and training a model using a training data set including a second manufacturing parameter that is included in the plurality of manufacturing parameters and is different from the first manufacturing parameter, and the difference, to generate the prediction model.

The example embodiments of the present disclosure provide: a manufacturing support system that is capable of improving the accuracy of a prediction model for predicting a property of an alloy material not only within the ranges of manufacturing conditions in a past manufacturing track record but also out of these ranges, and of selecting manufacturing conditions meeting a target design range of the property, using the prediction model; and a method and computer program for generating a prediction model.

DETAILED DESCRIPTION

Figure 1:
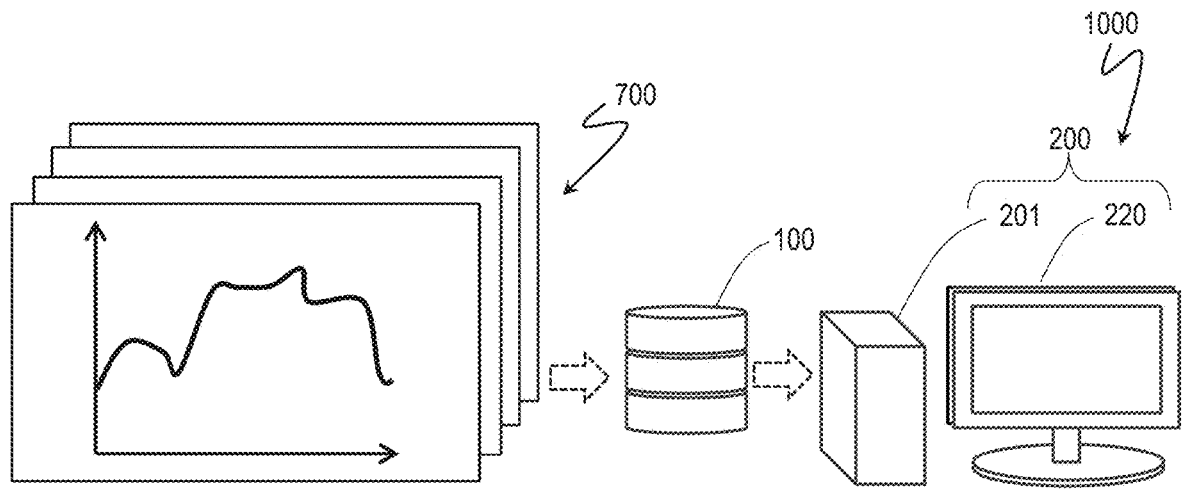
FIG. 1 is a block diagram illustrating a rough configuration of a manufacturing support system according to an embodiment of the present disclosure that predicts a property of an alloy material.

Material manufacturers have classified materials, and accumulated test data on each material according to, for example, the JIS standards. For example, aluminum alloys (hereinafter referred to as an "Al alloy") are classified as A1000 series, A2000 series, A3000 series, A4000 series, A5000 series, A6000 series, and A7000 series, based on the material property designations of the JIS standards. For each Al alloy, there is accumulated test data such as a stress-strain curve obtained by a tensile test compliant with the JIS standards, for example.

It is known that each series of alloys exhibit mechanical properties such as tensile strength, proof stress, and elongation. However, individual products may have different mechanical properties, depending on the manufacturing process or manufacturing condition (e.g., the temperature, rate, or time of a heat treatment), even though the products have the same Al alloy composition. It is not easy to efficiently select an optimum product having required properties or the like (including not only mechanical properties but also cost, supply stability, product life, etc.) from such a lot of products. Such a problem is not limited to Al alloys, and also lies with various materials such as other alloy materials or polymer materials.

An alloy material, such as an Al alloy, is manufactured through a plurality of manufacturing processes including various types of processes. For example, a heat-treated Al alloy plate (aluminum plate) is manufactured through various manufacturing processes such as casting, homogenization, hot rolling, cold rolling, and annealing. Environmental conditions (disturbances) such as atmospheric temperature vary due to seasonal fluctuations. Therefore, in order to obtain optimum mechanical properties of an Al alloy required for an aluminum plate manufactured through such steps, it is necessary to select or adjust manufacturing conditions for the annealing step, for example. Traditionally, a mechanical property of an alloy material is predicted based on a metallurgical or empirical prediction expression, and manufacturing conditions are selected or adjusted based on the prediction expression.

The present inventors' study has indicated that various parameters used in the prediction expression are adjusted by a human, which significantly disadvantageously requires time and effort. A relationship between manufacturing conditions and a mechanical property can be learned using machine learning, typified by deep learning, or statistical modeling. However, in actual manufacturing sites, in order to prevent nonconforming defective products from being provided to the customers, manufacturing conditions are controlled so as to meet required ranges of mechanical properties, i.e., stabilize mechanical properties. As a result, biased data may be accumulated in a database. In such control, manufacturing conditions need to be modified after a change has occurred in a mechanical property. Therefore, if a search is performed for manufacturing conditions that meet the standard range of a mechanical property, an unexpected search result may be obtained, and a predicted mechanical property may significantly deviate from the standard value. Thus, disadvantageously, a relationship between manufacturing conditions and a mechanical property may not be correctly learned. This is attributed to problems with interpolation and extrapolation that may arise in using a so-called machine learning model.

With such a problem in mind, the present inventors have conceived of a novel method of using a theoretical expression in combination with machine learning to construct a model that can be used to predict a property of an alloy material from manufacturing conditions, and using the model to select manufacturing conditions that meet a range that cannot be learned by machine learning, i.e., the standard range of a property by extrapolation.

A manufacturing support system, prediction method, and prediction model according to the present disclosure that predict a property of an alloy material will be described in detail below with reference to the accompanying drawings. It should be noted that unnecessarily detailed descriptions may be avoided. For example, to avoid unnecessarily obscuring the present disclosure, well-known features may not be described or substantially the same elements or steps may not be redundantly described, for example. This is also for ease of understanding the present disclosure. In the following description, like elements may be indicated by like reference numerals.

The embodiments described below are for illustrative purposes. The manufacturing support system, prediction method, and prediction model generation method according to the present disclosure that are for predicting a property of an alloy material are not limited to the embodiments described below. For example, numerical values, shapes, materials, steps, and the order of the steps, etc., indicated in the embodiments described below are merely illustrative, and various modifications can be made thereto unless a technical contradiction occurs. The embodiments can be used in various combinations unless a technical contradiction occurs.

FIG. 1 is a block diagram illustrating a rough configuration of a manufacturing support system 1000 according to this embodiment that predicts a property of an alloy material. The manufacturing support system (hereinafter simply referred to as a "system") 1000 includes a database 100 and a data processing device 200. In this embodiment, the database 100 stores data groups each of which contains a plurality of manufacturing parameters each representing a corresponding one of manufacturing conditions for manufacturing processes, and a measured value of at least one property of an alloy material manufactured by the manufacturing processes under the manufacturing conditions.

In this embodiment, the alloy material is an Al alloy. The system 1000 can predict a property of an Al alloy, and select manufacturing conditions that meet a required standard range of the property. The system 1000 may also be used as systems for supporting manufacturing of various alloy materials other than Al alloys. The manufacturing conditions that meet a required standard range of a property are hereinafter referred to as "optimum manufacturing conditions."

An example of a property of an alloy material is a mechanical property. Examples of a property of an alloy material may include electrical properties, thermal properties, magnetic properties, and optical properties. In this embodiment, examples of a property of an Al alloy include mechanical properties, such as yield stress YS, proof stress, tensile strength TS, elongation EL, elastic modulus (Young's modulus), and Poisson's ratio or YS/TS ratio (yield ratio). Such mechanical properties are, for example, obtained based on a stress-strain curve obtained by a tensile test compliant with standards. The shape of a stress-strain curve varies depending on the composition of a material, manufacturing processes, manufacturing conditions, test conditions, and the like.

A material manufacturer classifies materials and accumulates test data of each material according to, for example, the JIS standards. Al alloys are classified as A1000 series, A2000 series, A3000 series, A4000 series, A5000 series, A6000 series, and A7000 series, based on the material property designations of the JIS standards, for example. For each Al alloy, there is accumulated test data such as a stress-strain curve obtained by a tensile test compliant with the JIS standards, for example.

A material manufacturer may accumulate, in the database 100, a huge amount of time-series process data obtained in manufacturing over several years, 10 years, 20 years, or a longer period of time, for example. The time-series process data may be accumulated in the database 100 in association with design/development information, manufacturing conditions such as the temperature, rate, or time of a heat treatment and weather data during manufacturing, test data 700, and the like. Such data groups are called big data.

In this embodiment, the plurality of manufacturing processes may include at least one of a raw material mixing step, dissolving step, casting step, homogenization step, hot rolling step, hot extrusion step, hot forging step, cold rolling step, foil rolling step, leveling step, solution treatment step, annealing step, and aging step.

In this embodiment, examples of a plurality of manufacturing conditions that are used in a plurality of manufacturing processes for an Al alloy include the type, Si amount, Mg amount, Cu amount, Fe amount, hot-rolling coiling temperature (° C.), cold-rolling coiling temperature (° C.), heat treatment temperature (° C.), heat treatment time (seconds), coiling temperature (° C.) after heat treatment, plate width (mm) during heat treatment, plate thickness (mm) during heat treatment, coil weight (kgf) after heat treatment, natural aging period (days) after heat treatment, and weather data during natural aging. These are herein referred to as a "manufacturing parameter" that represents a manufacturing condition for each manufacturing process. Of the plurality of manufacturing parameters, the heat treatment time and the coiling temperature mean a heat treatment time and a coiling temperature, respectively, in a heat treatment furnace. As a facility for conducting the heat treatment, a continuous annealing line (CAL) may be used, for example. The heat treatment temperature may be a set temperature of the heat treatment furnace, or a temperature that is obtained by measuring a plate during the heat treatment.

In this embodiment, of the plurality of manufacturing parameters, the heat treatment temperature is referred to as a "first manufacturing parameter," and parameters other than the heat treatment temperature are referred to as a "second manufacturing parameter." The first and second manufacturing parameters are described in detail below.

The types of Al alloys are roughly divided into heat-treated alloys and non-heat-treated alloys. The type of an Al alloy may be classified according to material property designation, alloy designation, or temper designation defined in the JIS standards, for example. For example, according to temper designation, the type of an Al alloy may be classified as one subjected to cold working after solution treatment, and further to natural aging (T3), one subjected to natural aging after solution treatment (T4), or the like.

The weather data contains an atmospheric temperature, humidity, sunshine duration, precipitation, and the like. For example, these pieces of weather data can be obtained based on weather information of an area where a manufacturing factory is located, which is published by a meteorological office, including a daily average atmospheric temperature, daily average humidity, weekly average atmospheric temperature, weekly average humidity, weekly average precipitation, weekly average sunshine duration, and the like.

The database 100 can store data groups in which the types of Al alloys and the plurality of manufacturing parameters are associated with mechanical properties, such as yield stress YS, proof stress, tensile strength TS, elongation EL, elastic modulus, and Poisson's ratio or YS/TS ratio, for example. The database 100 is a storage device, such as a semiconductor memory, magnetic storage device, or optical storage device.

The data processing device 200 can access huge data accumulated in the database 100 to obtain a plurality of manufacturing parameters, and the measured value of at least one mechanical property associated with the manufacturing parameters.

The data processing device 200 includes a data processing device body 201 and a display device 220. For example, software (or firmware) that is used to generate a prediction model for predicting a mechanical property of an Al alloy using data accumulated in the database 100, and software that is used to select optimum manufacturing conditions using a trained prediction model, are implemented in the data processing device body 201. These pieces of software may be commercially available as packaged software stored in a computer-readable storage medium, such as an optical disc, or may be provided through the Internet.

The display device 220 is, for example, a liquid crystal display or organic EL display. The display device 220 is, for example, capable of displaying a predicted value of a mechanical property and/or optimum manufacturing conditions of an Al alloy based on data output from the body 201.

A typical example of the data processing device 200 is a personal computer. Alternatively, the data processing device 200 may be a dedicated device that functions as a manufacturing support system.

Figure 2:
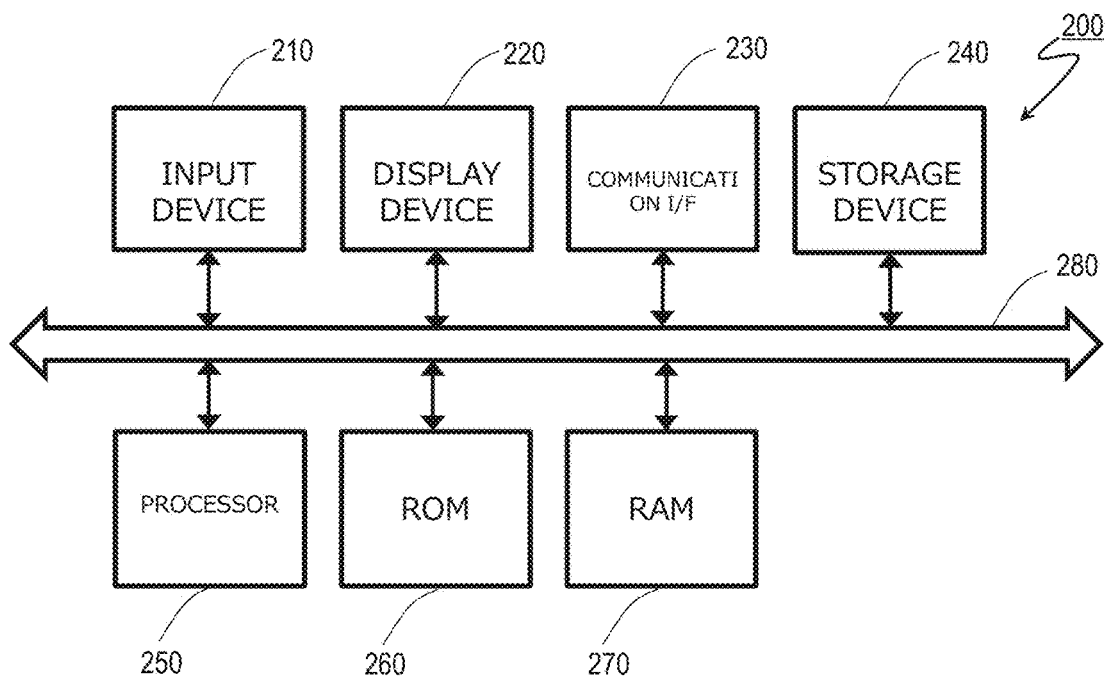
FIG. 2 is a block diagram illustrating an example of a hardware configuration of a data processing device.

FIG. 2 is a block diagram illustrating an example of a hardware configuration of the data processing device 200. The data processing device 200 includes an input device 210, a display device 220, a communication I/F 230, a storage device 240, a processor 250, a read only memory (ROM) 260, and a random access memory (RAM) 270. These constituent elements are connected together through a bus 280 so as to communicate with each other.

The input device 210 converts instructions from the user into data, which is in turn input to the computer. The input device 210 is, for example, a keyboard, mouse, or touch panel.

The communication I/F 230 is for data communication between the data processing device 200 and the database 100. The form and protocol of the communication I/F 230 are not limited, as long as the communication I/F 230 can transfer data. For example, the communication I/F 230 allows wired communication compliant with USB, IEEE1394 (registered trademark), Ethernet (registered trademark), or the like. The communication I/F 230 allows wireless communication compliant with the Bluetooth (registered trademark) standard and/or the Wi-Fi standard. These standards include a wireless communication standard that uses the 2.4 GHz or 5.0 GHz frequency band.

The storage device 240 is, for example, a magnetic storage device, an optical storage device, a semiconductor storage device, or a combination thereof. Examples of the optical storage device include optical disk drives and magneto-optical disk (MD) drives. Examples of the magnetic storage device include hard disk drives (HDDs), floppy disk (FD) drives, and magnetic tape recorders. Examples of the semiconductor storage device include solid-state drives (SSDs).

The processor 250 is a semiconductor integrated circuit, and is also referred to as a central processing unit (CPU) or microprocessor. The processor 250 sequentially executes a computer program that is stored in the ROM 260 and that includes instructions to train a prediction model and use the trained model, thereby carrying out a desired process.

The data processing device 200 may include, in addition to or instead of the processor 250, a field programmable gate array (FPGA), graphics processing unit (GPU), application specific integrated circuit (ASIC), or application specific standard product (ASSP) with a CPU mounted thereon, or a combination of two or more selected from these circuits.

The ROM 260 is, for example, a writable memory (e.g., a PROM), a rewritable memory (e.g., a flash memory), or a read-only memory. The ROM 260 stores a computer program that controls operations of the processor. The ROM 260 may not necessarily be a single storage medium, or may be a set of storage media. A portion of the set of storage media may be removable.

The RAM 270 provides a work area into which the computer program stored in the ROM 260 will be temporarily loaded during boot-up. The RAM 270 may not necessarily be a single storage medium, and may be a set of storage media.

Some representative examples of the system 1000 of the present disclosure will be described below.

In a first example configuration, the system 1000 includes the database 100 and the data processing device 200 of FIG. 1. The database 100 is a piece of hardware different from the data processing device 200. Alternatively, a storage medium such as an optical disc that stores huge data may be read into the body 201 of the data processing device 200, and therefore, instead of the database 100, the storage medium may be accessed so that huge data can be read.

In a second example configuration, the system 1000 is the data processing device 200 alone. In that case, the huge test data 700 may be previously stored in the storage device 240, such as an HDD. In this example configuration, examples of the data processing device 200 may include laptop PCs, tablet terminals, and smartphones.

Figure 3:
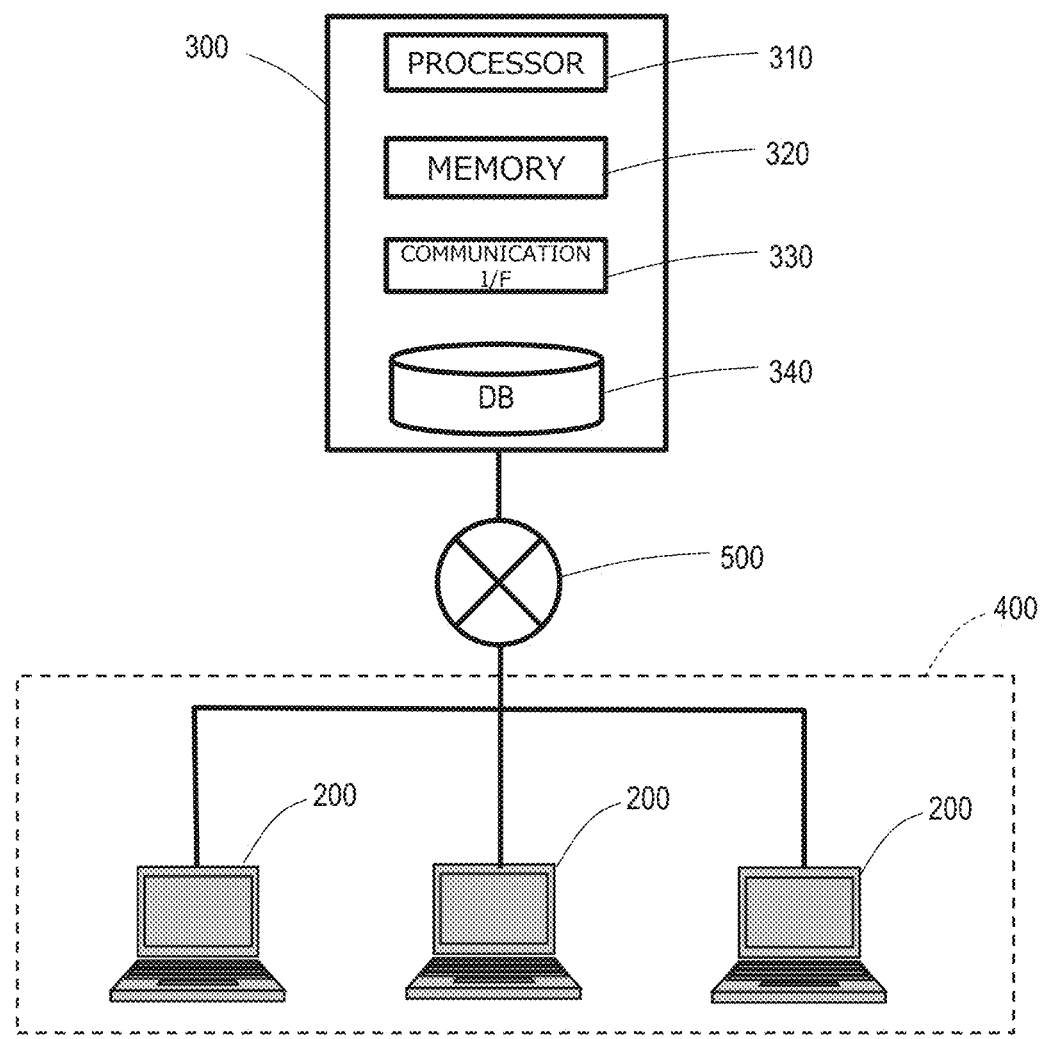
FIG. 3 is a hardware block diagram illustrating an example of a configuration of a cloud server having a database storing huge data.

FIG. 3 is a hardware block diagram illustrating an example of a configuration of a cloud server 300 having a database 340 storing huge data.

In an embodiment of the third example configuration, as illustrated in FIG. 3 a system 1000 includes one or more data processing devices 200 and the database 340 of the cloud server 300. The cloud server 300 has a processor 310, a memory 320, a communication I/F 330, and the database 340. Huge data may be stored in the database 340 of the cloud server 300. For example, the plurality of data processing devices 200 may be connected together through a local area network (LAN) 400 constructed in a company. The local area network 400 is connected to the Internet 500 through an Internet provider service (IPS). Each data processing device 200 can access the database 340 of the cloud server 300 through the Internet 500.

In another embodiment, a system 1000 may include one or more data processing devices 200 and a cloud server 300. In that case, a processor 310 included in the cloud server 300 is capable of serially executing a computer program including instructions to train a prediction model and using the trained model, instead of the processor 250 included in the data processing device 200 or in cooperation with the processor 250. Alternatively, for example, a plurality of data processing devices 200 connected to the same LAN 400 may execute the computer program including such instructions in cooperation with each other. Such a distributed process performed by the plurality of processors can reduce calculation load on each processor.

Figure 4:
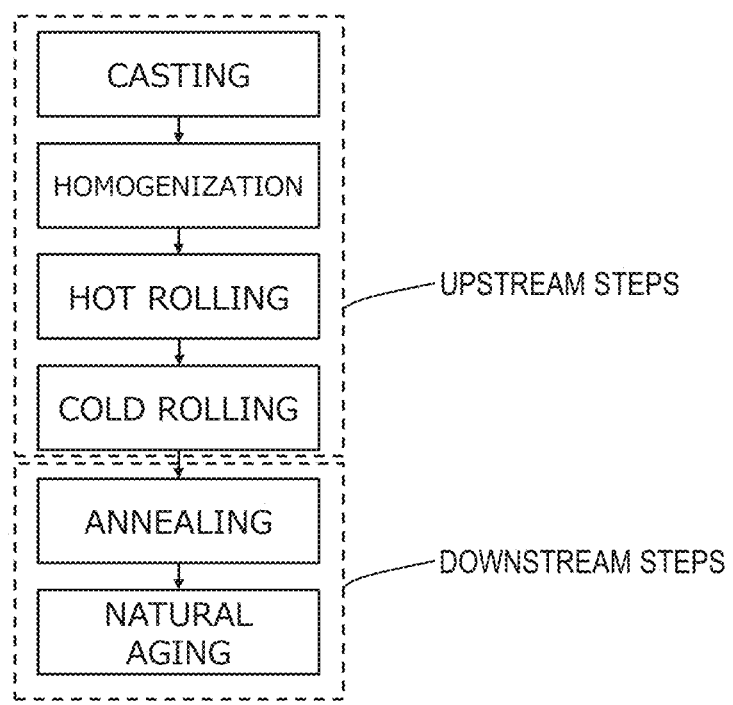
FIG. 4 is a flowchart illustrating a general manufacturing flow including a manufacturing process of an Al alloy whose temper designation is T4.

FIG. 4 illustrates a general manufacturing flow including a manufacturing process of an Al alloy whose temper designation is T4. In the illustrated example, a plurality of manufacturing processes include a casting step, homogenization step, hot rolling step, cold rolling step, annealing step, and natural aging step. In this embodiment, of these steps, the manufacturing process including the casting step to the cold rolling step is referred to as an upstream step, and the manufacturing process including the annealing step to the natural aging step is referred to as a downstream step, which manufacturing processes are thus distinguished from each other. The annealing step in the downstream step may, for example, be carried out using a continuous annealing line.

The Al alloy in this embodiment is, for example, an A6000-series alloy that is manufactured according to the T4 manufacturing flow illustrated in FIG. 4. For each set of the plurality of manufacturing parameters, the database 100 contains, as a manufacturing track record, an accumulation of measured values of mechanical properties such as yield stress YS, tensile strength TS, and elongation EL.

Figure 5:
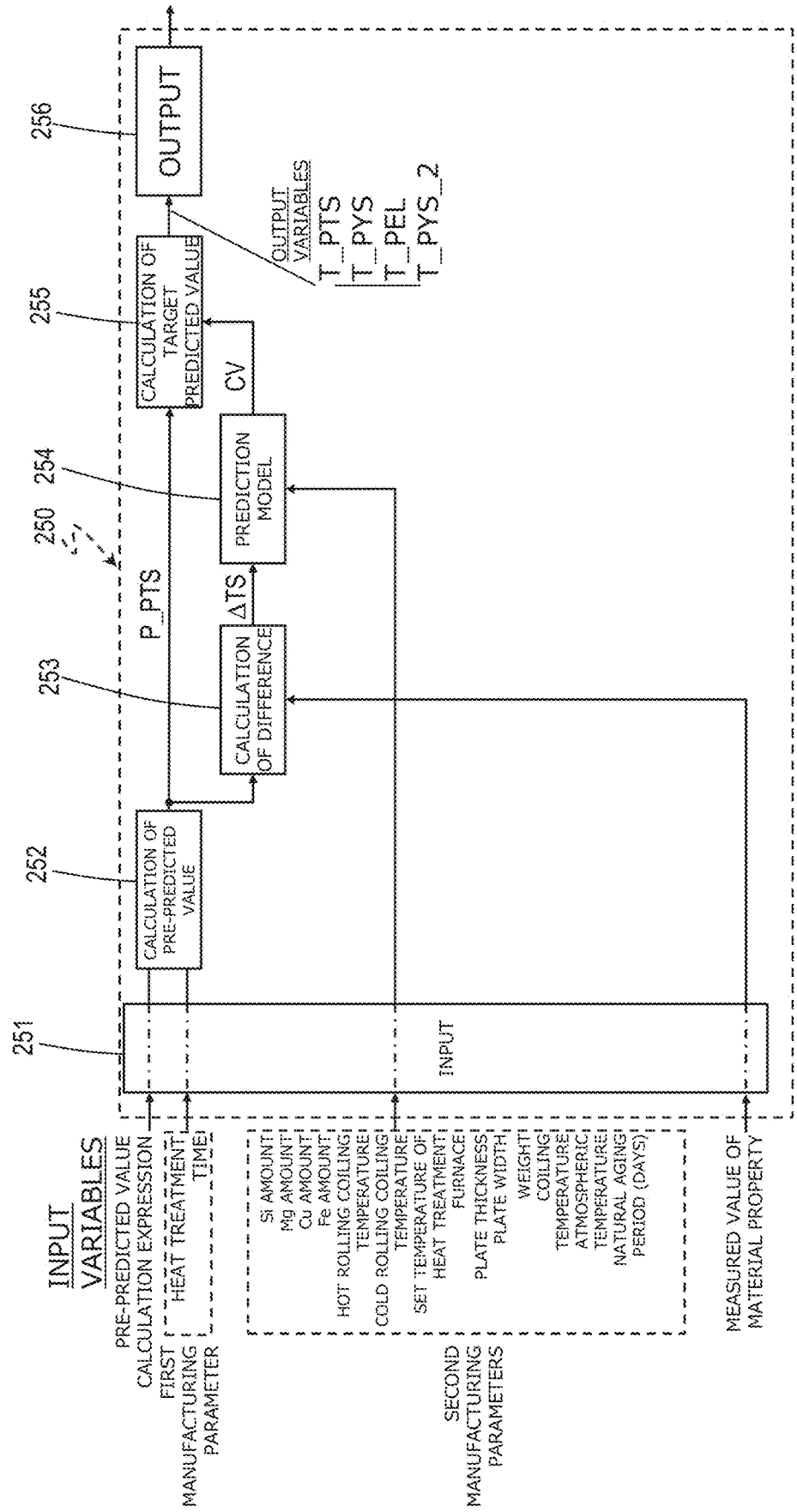
FIG. 5 is a functional block diagram illustrating a function of the system that is processed by a processor, by functional blocks.
Figure 6:
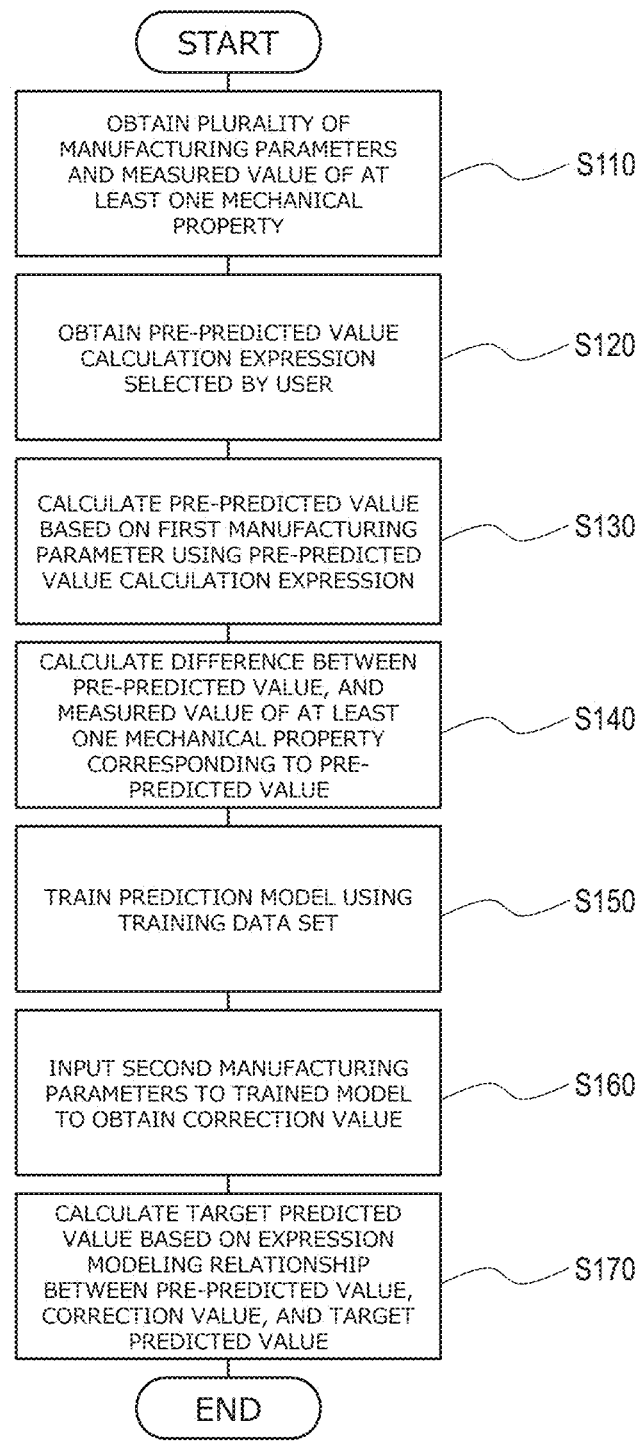
FIG. 6 is a flowchart illustrating a process procedure of generating a prediction model that is used to predict a mechanical property of an Al alloy.

FIG. 5 is a functional block diagram illustrating a function of the system 1000 that is processed by the processor 250, by functional blocks. FIG. 6 is a flowchart illustrating a process procedure of generating a prediction model that is used to predict a mechanical property of an Al alloy.

The processor 250 has an input unit 251, a pre-predicted value calculation unit 252, a difference calculation unit 253, a prediction model unit 254, a target predicted value calculation unit 255, and an output unit 256. The word "unit" is added to the name of each functional block for the sake of convenience. For example, the block of calculation of a pre-predicted value is denoted by the pre-predicted value calculation unit 252. Typically, a process (or a task) of a functional block corresponding to each unit is described as a module unit of software in a computer program. It should be noted that in the case in which an FPGA or the like is used, all or a portion of these functional blocks may be implemented as a hardware accelerator.

The input unit 251 accesses the database 100 to obtain, as input variables, a plurality of manufacturing parameters and a measured value of at least one mechanical property (step S110). A measured value of a mechanical property is obtained by a tensile test conducted on an Al alloy that is manufactured under manufacturing conditions for the manufacturing process. In the illustrated example, the input unit 251 obtains, as input variables, the second manufacturing parameters obtained from a past manufacturing track record.

The input unit 251 obtains, as an input variable, a pre-predicted value calculation expression, which may be selected by a user such as an operator or developer (step S120). Pre-predicted value calculation expressions include an expression for predicting a mechanical property in a region that data is not obtained from the past manufacturing track record, using a metallurgically theoretical expression or empirical expression in materials engineering. Pre-predicted value calculation expressions are obtained by formalizing the know-how to perform actual manufacturing processes. Each time manufacturing is conducted, a metallurgically theoretical expression or empirical expression may be accumulated. In generating a prediction model, the user can select one from a plurality of metallurgically theoretical expressions or empirical expressions, as a pre-predicted value calculation expression, and input the selected one into the system 1000. Alternatively, a predetermined function that cannot be selected by the user may be used as a pre-predicted value calculation expression.

The input unit 251 also obtains, as an input variable, a measured value of a tensile strength TS, which is a mechanical property. The input unit 251 may also obtain, as an input variable, a measured value of at least one of a yield stress YS, elongation EL, and proof stress. A tensile strength, yield stress, proof stress, and elongation are hereinafter denoted by TS, YS, YS_2, and EL, respectively.

The input unit 251 accesses the database 100 to obtain a plurality of data sets that have been obtained by performing a manufacturing process a plurality of times in the past. Each data set contains a plurality of manufacturing parameters obtained for each coil (or each lot) meaning a series of steps including the casting step to the natural aging step. Each data set also contains a measured value of TS obtained by measurement for each coil. The input unit 251 obtains a data set corresponding to 1000 coils, for example.

The pre-predicted value calculation unit 252 calculates a pre-predicted value based on the first manufacturing parameter using a pre-predicted value calculation expression (step S130). A pre-predicted value calculation expression describes a relationship between the first manufacturing parameter included in the plurality of manufacturing parameters obtained by the input unit 251, and a pre-predicted value of a mechanical property. A pre-predicted value represents a roughly calculated value of a target predicted value that is a target value of a mechanical property. In this embodiment, the first manufacturing parameter is a heat treatment time HT. A pre-predicted value P_PTS of TS represents a roughly calculated value of a target predicted value T_PTS that is a target value of TS. A pre-predicted value calculation expression describes a relationship between the heat treatment time HT and the pre-predicted value P_PTS of TS.

In this embodiment, a pre-predicted value calculation expression is provided as a quadratic expression of a variable based on the heat treatment time HT, which is the first manufacturing parameter. The pre-predicted value calculation expression is not limited to a quadratic expression, and may be represented by a numerical expression such as a linear expression or a cubic or higher-degree expression. A model example of the pre-predicted value calculation expression that can be used for a heat-treated Al alloy is described below. The pre-predicted value calculation expression of this example is represented by expression 1.

$$P\_PTS = -206.85 HT^2 + 544.63 HT - 122.61 \quad \text{Expression 1}$$

The difference calculation unit 253 calculates a difference between a pre-predicted value calculated by the pre-predicted value calculation unit 252, and a measured value of at least one property corresponding to the pre-predicted value (step S140). In this embodiment, the difference calculation unit 253 calculates a difference ΔTS between the pre-predicted value P_PTS, and a measured value of TS corresponding to the pre-predicted value P_PTS. The difference ΔTS represents a difference between a measured value of TS in a manufacturing track record, and a roughly calculated value of a predicted value of TS that is the result of prediction based on manufacturing conditions in the manufacturing track record, using the pre-predicted value calculation expression.

The prediction model unit 254 trains a prediction model using the second manufacturing parameters that are included in the plurality of manufacturing parameters and are different from the first manufacturing parameter, and training data sets (or training data) including the difference ΔTS calculated by the difference calculation unit 253 (step S150). In this embodiment, the second manufacturing parameters include weather data. An example of the weather data is a past average atmospheric temperature in the manufacturing track record.

In this embodiment, the training data sets include the second manufacturing parameters that are included in the plurality of manufacturing parameters input to the input unit 251 and are different from the first manufacturing parameter, and excludes the first manufacturing parameter, which mainly contributes to input variables input to the pre-predicted value calculation unit 252. The first manufacturing parameter of this embodiment is the heat treatment time HT. In other words, the training data sets do not include the heat treatment time HT.

In this embodiment, the prediction model unit 254, which is a supervised prediction model, is constructed by a neural network (NN). An example of the neural network is a multilayer perceptron (MLP). The MLP is also called a feedforward neural network. The supervised prediction model is not limited to neural networks, and may, for example, be a support-vector machine, random forest, or the like.

Figure 7:
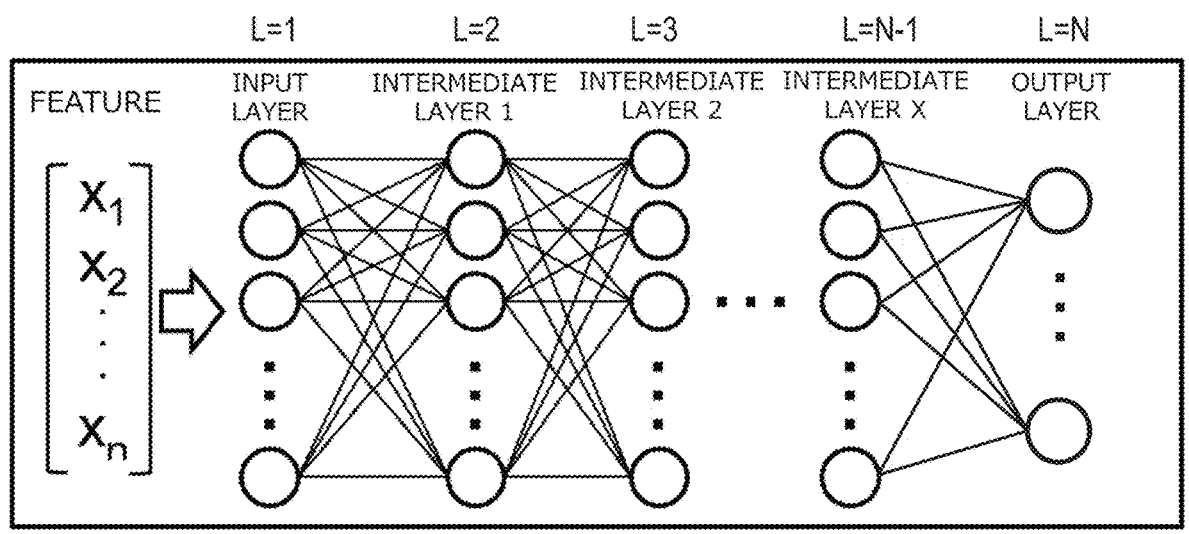
FIG. 7 is a diagram illustrating an example of a configuration of a neural network.

FIG. 7 is a diagram illustrating an example of a configuration of a neural network. The illustrated neural network is an MLP that includes N layers including the first layer as an input layer and the Nth layer (last layer) as an output layer. The second to (N−1)th layers of the N layers are called an intermediate layer (or a "hidden layer"). The number of units (or "nodes") included in the input layer is n, which is the same as the number of dimensions of a feature that is input data. In this embodiment, the input layer includes six units corresponding to six manufacturing parameters included in the training data set. The output layer includes four units. In this embodiment, the number of intermediate layers is three, and the total number of units is 300.

In MLPs, information propagates from the input layer to the output layer in one direction. Each unit receives a plurality of inputs, and calculates a single output. In the case in which the plurality of inputs are $[x_1, x_2, x_3, \ldots, x_i$ (i is an integer of two or more)], the overall input to the unit is obtained by multiplying the inputs x by respective weights w, adding up the resulting weighted inputs x, and adding a bias b to the result of the summation, which is represented by expression 2. In expression 2, $[w_1, w_2, w_3, \ldots, w_i]$ are weights for the respective inputs. The output z of the unit is given as the output of a function f called an activation function for all inputs u, which is represented by expression 3. The activation function is typically a monotonically increasing nonlinear function. An example of the activation function is a logistic sigmoid function, which is represented by expression 4. In expression 4, e represents Napier's constant.

$$u = x_1 w_1 + x_2 w_2 + x_3 w_3 + \ldots + w_i w_i + b \quad \text{Expression 2}$$

$$z = f(u) \quad \text{Expression 3}$$

$$f(u) = 1/(1+e^{-u}) \quad \text{Expression 4}$$

Each unit in one layer is connected to every unit in the following layer. As a result, an output of a unit in a left layer is an input of a unit in a right layer, which connection allows a signal to propagate from the left layer to the right layer in one direction. By determining the outputs of the layers sequentially while optimizing the parameters, i.e., the weights w and the bias b, the final output of the output layer is obtained.

The training data set also includes the difference ΔTS output by the difference calculation unit 253. The difference ΔTS is used as supervisory data. In neural networks, the parameters (the weights w and the bias b) are optimized based on a loss function (squared error) such that the output of the output layer approaches the difference ΔTS. In this embodiment, the number of epochs is about 1000. A prediction model can be represented by expression 5. The second manufacturing parameters, which are an input variable for a neural network, are an explanatory variable, and fall within the data ranges in the manufacturing track record. The output of a neural network is a target variable. The prediction model is preferably optimized using an optimization algorithm such as Adam.

$$\text{Output (corrected value CV)} = \text{NN(second manufacturing parameters)} \quad \text{Expression 5}$$

As a result of training the prediction model, a trained model is generated. The prediction model unit 254 inputs, to the trained model, input variables including an average atmospheric temperature, which is a second manufacturing parameter, to obtain a correction value CV for correcting a difference ΔPTS between the target predicted value T_PTS and the pre-predicted value P_PTS (step S160). The input variables input to the trained model may include, in addition to the average atmospheric temperature, other manufacturing parameters (e.g., a coiling temperature and a natural aging period) that fall within the data ranges in the manufacturing track record.

The correction value CV is a difference between a roughly calculated value (pre-predicted value P_PTS) of a predicted value of TS based on past manufacturing conditions in the manufacturing track record, and the target predicted value T_PTS. The correction value CV indicates an estimated error of the target predicted value T_PTS.

As in the case of TS, the prediction model unit 254 obtains a correction value CV for correcting a difference ΔPYS between a target predicted value T_PYS that is a target value of YS, and a pre-predicted value P_PTS, a correction value CV for correcting a difference ΔPEL between a target predicted value T_PEL that is a target value of EL, and a pre-predicted value P_PTS, and a correction value CV for correcting a difference ΔPYS_2 between a target predicted value T_PYS_2 that is a target value of YS_2, and a pre-predicted value P_PTS. These four correction values CV are output from the four respective outputs of the output layer in the neural network.

The correction value CV for YS indicates an estimated error of the target predicted value T_PYS. The correction value CV for EL indicates an estimated error of the target predicted value T_PEL. The correction value CV for YS_2 indicates an estimated error of the target predicted value T_PYS_2.

The target predicted value calculation unit 255 calculates a target predicted value from a pre-predicted value and a correction value based on an expression modeling a relationship between the pre-predicted value, the correction value, and the target predicted value (step S170). The expression modeling that relationship is a linear expression of the pre-predicted value P_PTS, which is, for example, represented by expressions 6 to 9. Expression 6 models a relationship between the pre-predicted value P_PTS, the correction value CV for TS, and the target predicted value T_PTS. Expression 7 models a relationship between the pre-predicted value P_PTS, the correction value CV for YS, and the target predicted value T_PYS. Expression 8 models a relationship between the pre-predicted value P_PEL, the correction value CV for EL, and the target predicted value T_PEL. Expression 9 models a relationship between the pre-predicted value P_PYS_2, the correction value CV for YS_2, and the target predicted value T_PYS_2.

| | |
|---|---|
| $T\_PTS = P\_PTS + CV$ | Expression 6 |
| $T\_PYS = 0.40 * P\_PTS + CV + 28$ | Expression 7 |
| $T\_PEL = -0.065 * P\_PTS + CV + 44$ | Expression 8 |
| $T\_PYS\_2 = 0.42 * P\_PTS + CV + 112$ | Expression 9 |

The target predicted value calculation unit 255 calculates the target predicted value T_PTS based on expression 6. The target predicted value calculation unit 255 calculates the target predicted value T_PYS based on expression 7. The target predicted value calculation unit 255 calculates the target predicted value T_PEL based on expression 8. The target predicted value calculation unit 255 calculates the target predicted value T_PYS_2 based on expression 9.

The output unit 256 outputs a predicted value of a mechanical property to a dedicated driver or controller (not illustrated) of the display device 220 so that the predicted value can be displayed on the display device 220. For example, the calculated target predicted values T_PTS, T_PYS, T_PEL, and T_PYS_2 are displayed on the display device 220.

Thus, for example, an operator or developer can predict mechanical properties such as TS, YS, EL, and YS_2 from past manufacturing conditions in the manufacturing track record using the manufacturing support system 1000.

Next, a method of selecting optimum manufacturing conditions using the trained model will be described. By using the trained model described above, optimum manufacturing conditions can be selected within a range that cannot be learned by machine learning, i.e., an extrapolation range.

Optimum manufacturing conditions can be selected by various process procedures (i.e., algorithms) using the trained model of this embodiment. First to third example implementations of algorithms will be described below. Computer programs including instructions describing these algorithms may, for example, be provided through the Internet. In the following description, it is assumed that each process is mainly performed by the data processing device 200 including the processor 250.

First Example Implementation

Figure 8:
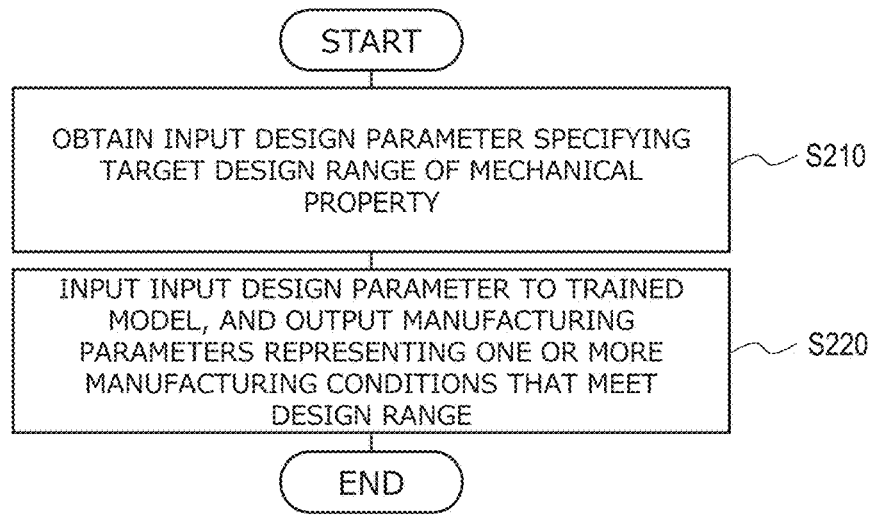
FIG. 8 is a flowchart illustrating a process procedure performed in a first example implementation.

FIG. 8 is a flowchart illustrating a process procedure performed in a first example implementation.

The data processing device 200 obtains at least one input design parameter that specifies a target design range of a mechanical property (step S210). For example, an operator can input an input design parameter that specifies a target design range or target predicted value T_PTS of TS to the data processing device 200 through the input device 210. The data processing device 200 inputs the input design parameter to the trained model, so that manufacturing parameters representing one or more manufacturing conditions that meet the design range can be output (step S220).

In this example implementation, manufacturing parameters that meet a target design range of a mechanical property can be obtained using the trained model. For example, if an input design parameter that specifies a target design range of TS is input to the data processing device 200, two manufacturing conditions, i.e., a heat treatment time and a coiling temperature, that meet the design range can be selected. The selected heat treatment time and coiling temperature may be displayed as a result of the selection on the display device 220 of the system 1000, for example.

Second Example Implementation

Figure 9:
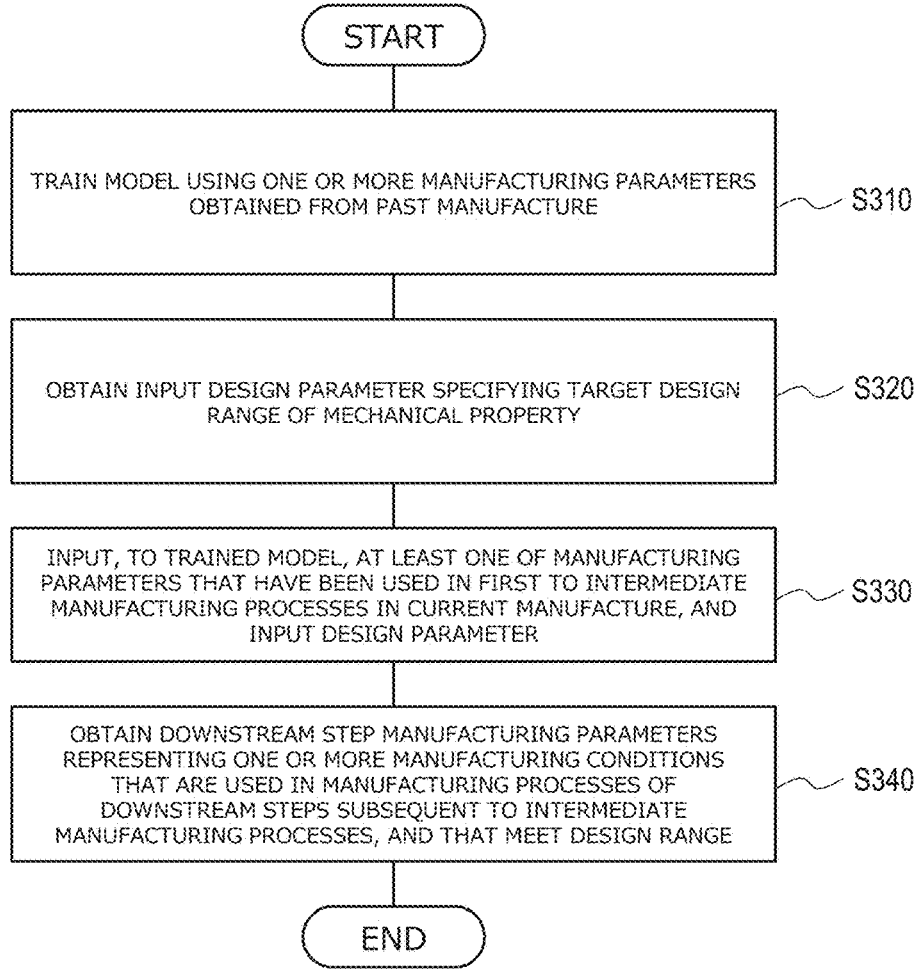
FIG. 9 is a flowchart illustrating a process procedure performed in a second example implementation.

FIG. 9 is a flowchart illustrating a process procedure performed in a second example implementation.

The data processing device 200 trains a prediction model using one or more manufacturing parameters obtained in past manufacture, i.e., one or more manufacturing parameters indicating past manufacturing conditions in a manufacturing track record (S310). This process is the same as the training of a model in step S150 described above.

Next, the data processing device 200 obtains at least one input design parameter that specifies a target design range of a mechanical property (S320). For example, an operator can input an input design parameter that specifies a target design range or target predicted value T_PTS of TS to the data processing device 200 through the input device 210.

Next, the data processing device 200 inputs at least one of manufacturing parameters representing one or more manufacturing conditions used in the first manufacturing process and intermediate manufacturing processes that have been completed since the first manufacturing process so far in current manufacture, and the input design parameter, to the trained model (step S330).

The data processing device 200 obtains downstream step manufacturing parameters representing one or more manufacturing conditions that meet the design range, which are used in manufacturing processes in the downstream step subsequent to the intermediate manufacturing processes (step S340).

It is, for example, assumed that the upstream steps including the first manufacturing process (casting step) to an intermediate manufacturing process (cold rolling step) illustrated in FIG. 4 have already been performed so far in manufacture being currently performed. In that case, the data processing device 200 inputs, for example, weather data (an average atmospheric temperature, average humidity, etc.) representing past manufacturing conditions for the casting step to the cold rolling step in the manufacturing track record, and the input design parameter, to the trained model. For example, the downstream step manufacturing parameters may include manufacturing parameters representing manufacturing conditions for the annealing step. The data processing device 200 can obtain, as an output of the trained model, two manufacturing parameters, i.e., a heat treatment time and a coiling temperature after heat treatment, that are used in the annealing step and that meet the design range of TS.

In this example implementation, manufacturing parameters that are used in the downstream steps and that meet a target design range of a mechanical property can be obtained using the trained model, where manufacturing conditions for manufacturing processes that have been performed in the upstream step are constraints.

Third Example Implementation

Figure 10:
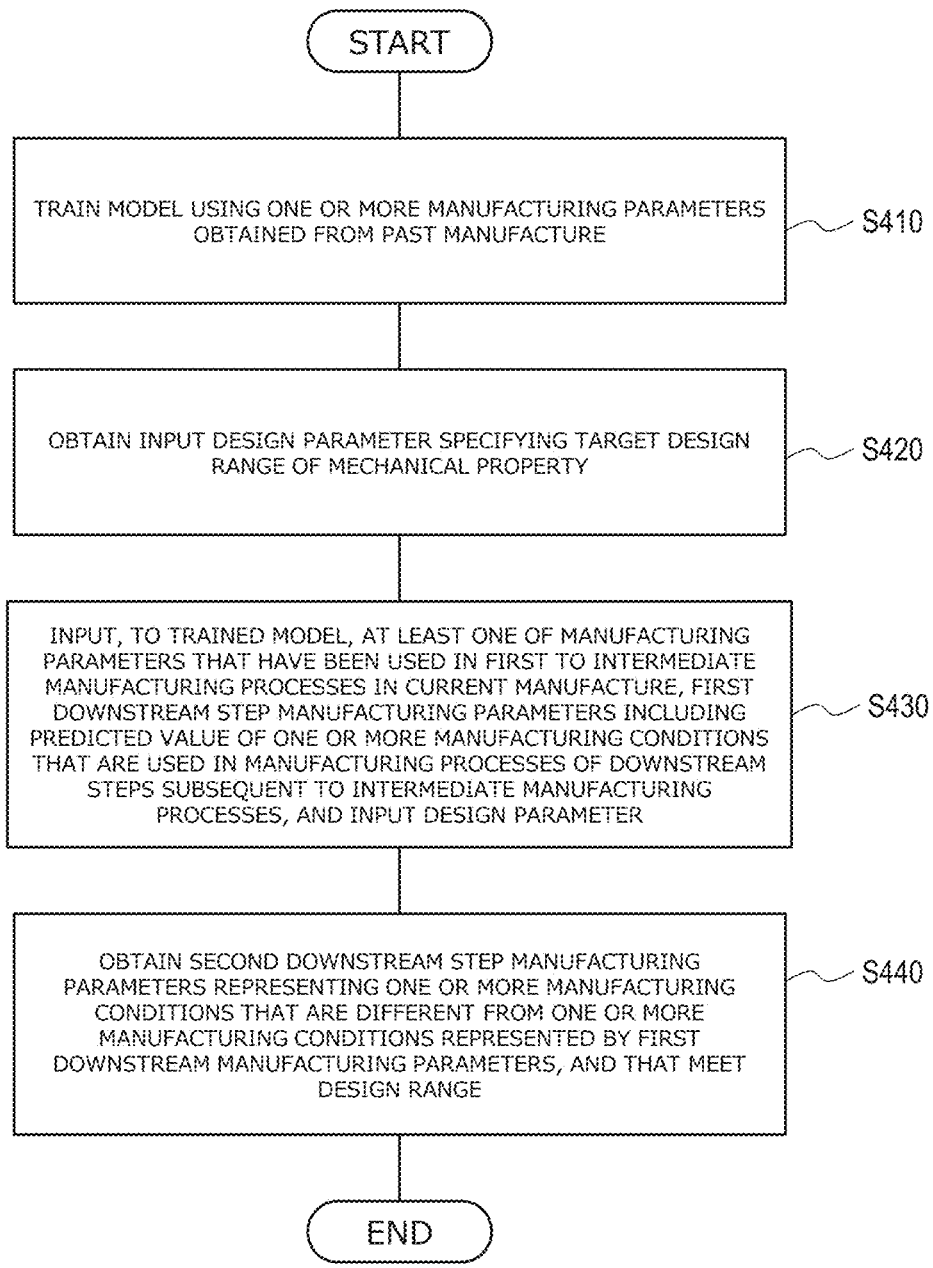
FIG. 10 is a flowchart illustrating a process procedure performed in a third example implementation.

FIG. 10 is a flowchart illustrating a process procedure of a third example implementation.

The data processing device 200 trains a prediction model using one or more manufacturing parameters indicating past manufacturing conditions in a manufacturing track record (S410). This process is the same as the training of a model in step S150 described above.

Next, the data processing device 200 obtains at least one input design parameter that specifies a target design range of a mechanical property (S420). For example, an operator can input an input design parameter that specifies a target design range or target predicted value T_PTS of TS to the data processing device 200 through the input device 210.

Next, the data processing device 200 inputs at least one of manufacturing parameters representing one or more manufacturing conditions used in the first and intermediate manufacturing processes that have already been performed so far in manufacture being currently performed, first downstream step manufacturing parameters including a predicted value of one or more manufacturing conditions used in the downstream manufacturing steps subsequent to the intermediate manufacturing processes, and the input design parameter, to the trained model (step S430). As in the second example implementation, it is, for example, assumed that the upstream steps including the casting step to the cold rolling step have already been performed so far in manufacture being currently performed. In that case, for example, the data processing device 200 inputs past weather data (an average atmospheric temperature, average humidity, etc.) representing manufacturing conditions for the upstream steps in the manufacturing track record, predicted values of future weather data (an average atmospheric temperature, average humidity, etc.) that are used in the manufacturing processes of the downstream steps, and the input design parameter, to the trained model.

The data processing device 200 obtains second downstream step manufacturing parameters representing one or more manufacturing conditions different from one or more manufacturing conditions represented by the first downstream step manufacturing parameters, and that meet the design range (step S440). For example, the data processing device 200 can obtain, as an output of the trained model, manufacturing parameters for a natural aging period that are different from weather data, that represent manufacturing conditions for the natural aging step, and that meet the design range of TS.

In this example implementation, future manufacturing parameters that are used in downstream manufacturing steps that have not yet been performed, and that meet a target design range of a mechanical property, can be obtained using the trained model, where past manufacturing conditions for manufacturing processes that have already been performed in the upstream and downstream steps are constraints.

Figure 11:
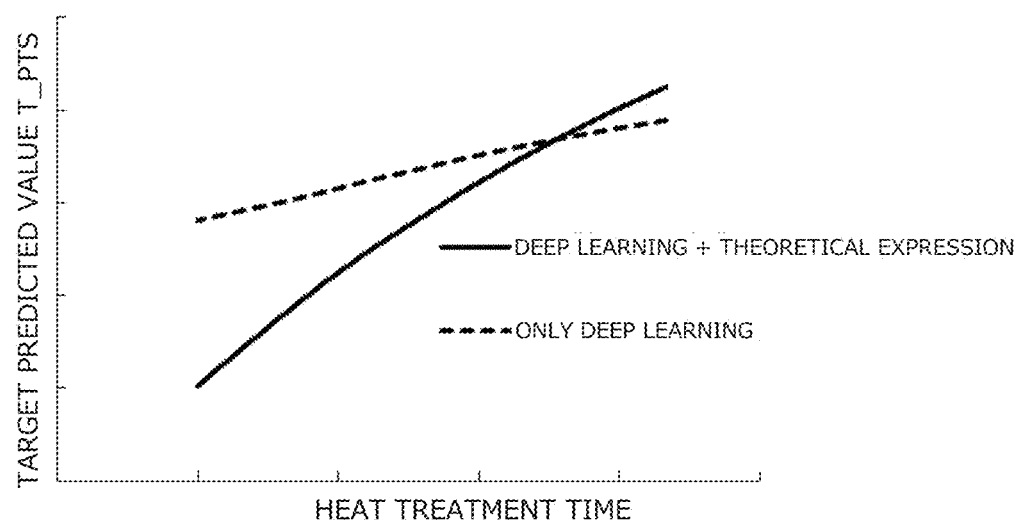
FIG. 11 is a graph illustrating a relationship between a heat treatment time and a target predicted value of a tensile strength.

FIG. 11 is a graph illustrating a relationship between the heat treatment time and the target predicted value T_PTS. The vertical axis represents the target predicted value T_PTS, while the horizontal axis represents the heat treatment time. In FIG. 11, the result of a simulation using machine learning alone, which is a conventional technique, is indicated by a dashed line, while the result of a simulation using a hybrid technique of this embodiment including a combination of machine learning and logical expressions is indicated by a solid line. It should be noted that unlike this embodiment, the heat treatment time is included in the training data during machine learning in the conventional technique.

In the case in which the conventional technique is used, the amount of a change in the target predicted value T_PTS with respect to a change in the heat treatment time, i.e., the slope of the graph, is small. This is because the heat treatment time is included as a manufacturing parameter in the training data, and the heat treatment time is adjusted such that the property TS falls within a target design range. As a result, an influence that the heat treatment time may have on other factors (manufacturing conditions) is canceled. Therefore, if optimum manufacturing conditions are searched for using the conventional technique, extremely great or small manufacturing conditions (nonconforming conditions) may be proposed by the system.

In the case in which the hybrid technique of this embodiment is employed, the amount of a change in the target predicted value T_PTS with respect to the amount of a change in the heat treatment time is great compared to the conventional technique. This is because the heat treatment time is included as a manufacturing parameter in the input variables of a logic expression instead of training data so that an influence of the heat treatment time on the other factors is reflected on the logic expression. As a result, the influences of the heat treatment time and the other factors on each other can be separated, and therefore, suitable manufacturing conditions can be selected in a range that is not covered by machine learning, i.e., an extrapolation range.

In particular, future suitable manufacturing conditions can be selected by using a predicted value of weather data, such as an average atmospheric temperature, as an input variable, and inputting the predicted value to the trained model. Therefore, the possibility that the system proposes nonconforming conditions can be reduced. As a result, optimum manufacturing conditions that meet a target design range can be selected by changing the heat treatment time to a smaller extent.

The present inventors have compared the hybrid technique of this embodiment with the conventional technique in terms of the accuracy of prediction of a material property and the selection of optimum manufacturing conditions, by performing cross-validation. Here, the accuracy of prediction of a material property is involved with interpolation in the trained model, and the selection of optimum manufacturing conditions is involved with extrapolation. The present inventors have found that both of the hybrid and conventional techniques have a similar accuracy of prediction of a material property, and the hybrid technique is more excellent than the conventional technique in terms of the selection of optimum manufacturing conditions.

Figure 12A:
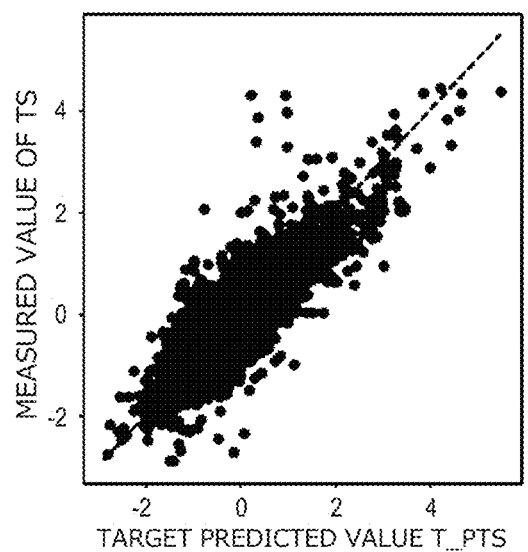
FIG. 12A is a graph illustrating the result of assessment of the accuracy of prediction of a tensile strength.
Figure 12B:
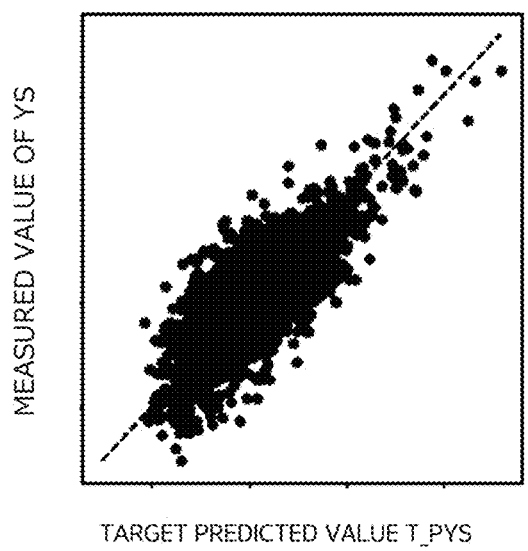
FIG. 12B is a graph illustrating the result of assessment of the accuracy of prediction of a yield stress.

Furthermore, the present inventors have compared a target predicted value with a measured value to investigate the accuracy of prediction of a material property. FIGS. 12A and 12B are graphs illustrating the result of assessment of the accuracy of prediction of a material property by the hybrid technique of this embodiment. FIG. 12A illustrates the result of comparison between target predicted values T_PTS and measured values of TS. FIG. 12B illustrates the result of comparison between target predicted values T_PYS and measured values of YS. In FIGS. 12A and 12B, the vertical axis indicates measured values, while the horizontal axis indicates target predicted values. The coefficients $R^2$ of determination of TS and YS are 0.61 and 0.66, respectively. The results show that the target predicted values T_PTS and T_PYS can be predicted with high accuracy.

The technique of the present disclosure may be widely useful for manufacturing support tools that are used to predict a property of an alloy material from manufacturing conditions, and to select manufacturing conditions that meet a standard range of a material property.

It is to be understood that although certain embodiments of the present invention have been described, various other embodiments and variants may occur to those skilled in the art that are within the scope and spirit of the invention, and such other embodiments and variants are intended to be covered by the following claims.

What is claimed is:

1. A manufacturing support system for predicting at least one property of an alloy material that is manufactured through a plurality of manufacturing processes, comprising:
    a processor;
    a memory to store a program for controlling an operation of the processor; and
    a storage device to store data including a plurality of manufacturing parameters each representing a corresponding one of manufacturing conditions for the manufacturing processes, and a measured value of the at least one property of the alloy material that has been manufactured under the manufacturing conditions for the manufacturing processes, wherein
    in accordance with the program, the processor performs operations comprising:
        accessing the storage device to obtain the plurality of manufacturing parameters and the measured value of the at least one property;
        obtaining a pre-predicted value calculation expression describing a relationship between a first manufacturing parameter included in the plurality of manufacturing parameters, and a pre-predicted value of the at least one property representing a calculated value of a target predicted value that is a target value of the at least one property;
        calculating the pre-predicted value based on the first manufacturing parameter using the pre-predicted value calculation expression;
        calculating a difference between the calculated pre-predicted value, and the measured value of the at least one property corresponding to the pre-predicted value; and
        training a model using a training data set including a second manufacturing parameter that is included in the plurality of manufacturing parameters and is different from the first manufacturing parameter, and the calculated difference, to generate a trained model that is used to predict the at least one property.

2. The manufacturing support system according to claim 1, wherein
    the processor performs operations including:
        inputting the second manufacturing parameter to the trained model to obtain a correction value for correcting a difference between the target predicted value and the pre-predicted value; and
        calculating the target predicted value from the pre-predicted value and the correction value based on an expression that models a relationship between the pre-predicted value, the correction value, and the target predicted value.

3. The manufacturing support system according to claim 1, wherein
    the pre-predicted value calculation expression is given as a quadratic expression of a variable based on the first manufacturing parameter.

4. The manufacturing support system according to claim 1, wherein
    the first manufacturing parameter is a heat treatment time.

5. The manufacturing support system according to claim 4, wherein
    the second manufacturing parameter includes weather data.

6. The manufacturing support system according to claim 5, wherein
    the second manufacturing parameter further includes a manufacturing parameter representing any of a chemical component, heat treatment temperature, coiling temperature, and natural aging period of the alloy material.

7. The manufacturing support system according to claim 6, wherein
    the second manufacturing parameter further includes a manufacturing parameter representing a weight of the alloy material.

8. The manufacturing support system according to claim 7, wherein
    the weather data is an average atmospheric temperature.

9. The manufacturing support system according to claim 1, wherein
    the first manufacturing parameter is a heat treatment time, the second manufacturing parameter includes weather data, and
    the processor performs operations including training the model using the training data set including the second manufacturing parameter.

10. The manufacturing support system according to claim 1, wherein
    the alloy material is an aluminum alloy.

11. The manufacturing support system according to claim 10, wherein
    the plurality of manufacturing processes includes at least one of a raw material mixing step, dissolving step, casting step, homogenization step, hot rolling step, hot extrusion step, hot forging step, cold rolling step, foil rolling step, leveling step, solution treatment step, annealing step, and aging step.

12. The manufacturing support system according to claim 1, wherein
    the processor performs further operations including:
        obtaining at least one input design parameter that specifies a target design range of a property; and
        inputting the input design parameter to the trained model, and outputting manufacturing parameters representing one or more manufacturing conditions that meet the design range.

13. The manufacturing support system according to claim 1, wherein
    after training the model using one or more manufacturing parameters obtained from past manufacture, the processor performs further operations including:
        obtaining at least one input design parameter that specifies a target design range of a property; and
        inputting, to the trained model, at least one of manufacturing parameters representing one or more manufacturing conditions used in a first manufacturing process and an intermediate manufacturing process or processes that have already been performed since the first manufacturing process so far in current manufacture, and the input design parameter, and outputting downstream step manufacturing parameters representing one or more manufacturing conditions that are used in a manufacturing process of a downstream step subsequent to the intermediate manufacturing process or processes and that meet the design range.

14. The manufacturing support system according to claim 13, wherein
the intermediate manufacturing process is a cold rolling step.

15. The manufacturing support system according to claim 13, wherein
the downstream step includes an annealing step, and
the downstream step manufacturing parameters include a manufacturing parameter representing a manufacturing condition in the annealing step.

16. The manufacturing support system according to claim 1, wherein
after training the model using one or more manufacturing parameters obtained from past manufacture, the processor performs further operations including:
obtaining at least one input design parameter that specifies a target design range of a property; and
inputting at least one of manufacturing parameters representing one or more manufacturing conditions used in a first manufacturing process and an intermediate manufacturing process or processes that have already been performed since the first manufacturing process so far in current manufacture, first downstream step manufacturing parameters including a predicted value of one or more manufacturing conditions used in a downstream manufacturing step subsequent to the intermediate manufacturing process or processes, and the input design parameter, to the trained model, and outputting second downstream step manufacturing parameters representing one or more manufacturing conditions different from the one or more manufacturing conditions represented by the first downstream step manufacturing parameters, and the second downstream step manufacturing parameters meeting the design range.

17. The manufacturing support system according to claim 1, wherein
the at least one property of the alloy material includes a mechanical property of the alloy material.

18. A method for generating a prediction model used for predicting at least one property of an alloy material that is manufactured through a plurality of manufacturing processes, comprising:
accessing data including a plurality of manufacturing parameters each representing a corresponding one of manufacturing conditions for the manufacturing processes, and a measured value of the at least one property of the alloy material that has been manufactured under the manufacturing conditions for the manufacturing processes, to obtain the plurality of manufacturing parameters and the measured value of the at least one property;
obtaining a pre-predicted value calculation expression describing a relationship between a first manufacturing parameter included in the plurality of manufacturing parameters, and a pre-predicted value of the at least one property representing a calculated value of a target predicted value that is a target value of the at least one property;
calculating the pre-predicted value based on the first manufacturing parameter using the pre-predicted value calculation expression;
calculating a difference between the calculated pre-predicted value, and the measured value of the at least one property corresponding to the pre-predicted value; and
training a model using a training data set including a second manufacturing parameter that is included in the plurality of manufacturing parameters and is different from the first manufacturing parameter, and the difference, to generate the prediction model.

19. A non-transitory computer readable storage medium comprising a computer program for causing a computer to generate a prediction model used for predicting at least one property of an alloy material that is manufactured through a plurality of manufacturing processes,
the computer program causing the computer to perform operations comprising:
accessing data including a plurality of manufacturing parameters each representing a corresponding one of manufacturing conditions for the manufacturing processes, and a measured value of the at least one property of the alloy material that has been manufactured under the manufacturing conditions for the manufacturing processes, to obtain the plurality of manufacturing parameters and the measured value of the at least one property;
obtaining a pre-predicted value calculation expression describing a relationship between a first manufacturing parameter included in the plurality of manufacturing parameters, and a pre-predicted value of the at least one property representing a calculated value of a target predicted value that is a target value of the at least one property;
calculating the pre-predicted value based on the first manufacturing parameter using the pre-predicted value calculation expression;
calculating a difference between the calculated pre-predicted value, and the measured value of the at least one property corresponding to the pre-predicted value; and
training a model using a training data set including a second manufacturing parameter that is included in the plurality of manufacturing parameters and is different from the first manufacturing parameter, and the difference, to generate the prediction model.

* * * * *